Patented July 18, 1944

2,353,959

UNITED STATES PATENT OFFICE 2,353,959

METHOD FOR REFINING SULPHUR

Robert C. Hills, Port Sulphur, La., assignor to Freeport Sulphur Company, New York, N. Y., a corporation of Delaware No Drawing. Application October 18, 1941, Serial No. 415,638

7 Claims. (Cl. 23—229)

This invention relates to the refinement of sulphur and more particularly to the treatment of crude sulphurs for the removal of organic or carbonaceous impurities. The treatment, however, is ordinarily carried out in such manner that all impurities are substantially completely removed, including in addition to the carbonaceous impurities also inorganic matter, acid and moisture.

The invention is of primary or special value when the process is applied to the refinement of relatively pure crude sulphurs, namely, those containing less than about 0.05 percent organic impurities or even less than 0.03 percent of such impurities, as are obtained, for example, by Frasch mining operations. Through operation of the instant process, the carbonaceous content may be easily reduced to less than 0.00001 percent. For all practical purposes the product may be described as one hundred percent rhombic sulphur.

A specific object of the invention is to provide a process of obtaining refined sulphur of high purity from relatively pure crude sulphur at a cost sufficiently low to supply the large demand for refined sulphur at present unsatisfied due to the high cost of production. Refined sulphur is highly desirable in the manufacture of gun powder, rubber, pigments, fumigants and insecticides, and in the sterilization and preservation of many agricultural products.

According to the only process now in commercial use for the production of refined sulphur, the crude sulphur is distilled and the vapors condensed in a large masonry work chamber wherein the temperature is maintained around 100° C., producing flowers of sulphur which condense as a fine powder on the walls of the chamber and/or a liquid sulphur which condenses on the floor of the chamber. The liquid sulphur is drawn off into molds where it hardens in the form of blocks or sticks referred to in the trade as "brimstone" or "roll sulphur."

The high cost of production of the refined sulphur in accordance with the foregoing process has caused a decrease in consumption of refined sulphur over a period of years. This high cost has been due to the large sized equipment necessary to produce a comparatively small tonnage. Furthermore, the operation of the process is dangerous due to the extremely explosive and inflammable nature of the sulphur vapors. The process is also costly due to the deterioration and short life of the retorts brought about by the corrosive action of sulphur at the temperatures maintained therein, and finally, due to the necessity of removing accumulations of carbonaceous residues from the chamber and the necessity for periodically discharging the complete contents of the chamber to waste. It is an object of the present invention to provide a process of producing refined sulphur which is economical to operate and of less danger to operators of the equipment required.

Many attempts have already been made to provide a substitute for the distillation process, but as far as applicant is aware none of these processes has been economically feasible. In accordance with these proposed processes the crude sulphur has been treated with various absorbent and decolorizing agents, such as fuller's earth, zeolites, activated carbon, silica gel, diatomaceous earth, and the like, such treatment involving a subsequent filtration or decantation. Other proposed processes combine with the absorbent treatment a treatment with chemical agents, such as sulphuric acid, aluminum chloride or a combination of sulphuric acid with various oxidizing agents, which treatments are followed by washing or by filtration to remove the carbonaceous impurities. Although these prior processes remove a large proportion of the carbonaceous content of the sulphur, they are not capable of economically producing a refined sulphur of the same quality as is produced by the practice of the instant invention.

Broadly considered, the instant invention involves reacting the impurities contained in crude sulphur with chloro-sulphonic acid and separating the reaction products formed from the sulphur. The treatment may be carried out by treating the sulphur in molten condition with a small quantity of the acid and when the acid has reacted with the organic impurities to form readily separable reaction products, removing such reaction products by any of a number of processes, including filtering or washing with superheated water. A steam-jacketed agitator vessel of conventional construction may be used for the treatment. The intimate contact with the acid is best effected when the sulphur is in a non-viscous molten form, which condition lies generally between 250° and 320° F.

The reason for the high purifying power of chloro-sulphonic acid as compared with other agents such as fuming sulphuric acid has not been definitely established. The acid appears to react with the organic impurities to form soluble sulphonates and chlorides which to some extent are polymerized and form tar-like compounds of high molecular weight.

The amount of chlorosulphonic acid used in any particular operation of the process depends upon the amount and nature of the organic impurities in the crude sulphur treated. The only requirement is that the amount be sufficient to convert the impurities into a separable form in a reasonable period of time. The proper amount can be readily determined by simple laboratory tests. The time of contact required for the operation depends upon several factors, including the efficiency of mixing apparatus in effecting intimate contact between the acid and the impurities and the amount and nature of the impurities. With ordinary crude sulphur and conventional agitating apparatus, a period of thirty minutes is usually sufficient.

In accordance with a preferred embodiment of the invention, the refinement of relatively pure crude sulphur or less pure sulphur is accomplished through the complementary action of chlorosulphonic acid and an absorbent material or filter aid of the nature hereinbefore described. The chlorosulphonic acid serves primarily to react with all or a part of the organic impurities to convert them into removable reaction products and the absorbent primarily to combine with or absorb such reaction products, but also to remove any unreacted fixed carbonaceous matter and inorganic impurities, and as well any excess or unreacted acid.

This combination treatment is preferably carried out by subjecting the crude molten sulphur to a successive treatment with the chlorosulphonic acid and the absorbent or filter aid, the acid being added and stirred into the molten sulphur for a short period, fifteen minutes usually being more than adequate, whereupon the absorbent is added and the mixture is agitated for a short period. Finally, the absorbent and impurities taken up by it are removed from the sulphur by filtration. The amount of absorbent material required depends upon the activity or absorption power of the particular absorbent selected, upon the method of use and purity desired in the refined sulphur. Activated absorbents are much preferred because one-half to one-third less quantity need be used, which small amounts lead to substantial operative advantages including higher filtration rates and lower cake losses.

Example 1

A quantity of crude sulphur containing 0.020 percent organic impurities is introduced into a steam-jacketed vessel provided with an agitator and heated to a temperature at which the sulphur changes to a low viscosity molten condition, a temperature of 250° to 260° F. usually being sufficient. Thereupon about 0.12 of one percent of chlorosulphonic acid is added. After agitating the mixture for a period of 10 to 15 minutes, 0.5 of one percent of an acid activated fuller's earth are introduced and stirred into the mass for an additional period of about 15 minutes. The absorbent and combined impurities are then filtered out and the pure molten sulphur passed to suitable molds such as are commonly used in the production of roll sulphur. The refined sulphur obtained is pure rhombic sulphur so free of carbonaceous impurities that its content of such matter cannot be measured by any process or apparatus heretofore known to the sulphur production art.

Example 2

Molten sulphur is treated in the manner described in Example 1 with 0.25 of one percent of chlorosulphonic acid and then with 0.5 of one percent of ordinary fuller's earth. An extremely pure sulphur is likewise obtained by this treatment.

In order to illustrate the superiority of the present process over the most closely related processes of the prior art, a number of tests have been carried out and are recorded in the tables below. In conducting the tests the various treatments were applied to an average Gulf Coast crude sulphur containing 0.025 percent carbonaceous content. The tests were conducted upon portions of the same sample of crude sulphur and under identical conditions of temperature, time of contact, filtration, and the like. The treatment was carried out at a temperature of about 300° F. for a total period of thirty minutes. In cases where acids and Super Filtrol are shown together, the treatments were effected successively, the molten sulphur being agitated with the acid for 15 minutes following which the Super Filtrol was added and agitation continued for an additional 15 minutes. In the treatments using the absorbents alone, the contact involved an agitation period of 30 minutes. The Super Filtrol referred to in the table is a trade name applied to an acid treated fuller's earth.

Table I

| Test No. | Reagent | Amount in lbs. per long ton of sulphur | Carbonaceous content of product, percent $CH_2$[1] |
|---|---|---|---|
| 1 | 25% fuming $H_2SO_4$ | 22.4 | |
|   | Super Filtrol | 22.4 | 0.001 |
| 2 | 25% fuming $H_2SO_4$ | 44.8 | |
|   | Super Filtrol | 44.8 | 0.00075 |
| 3 | do | 44.8 | 0.004 |
| 4 | Activated carbon | 44.8 | 0.006 |
| 5 | Activated zeolite | 44.8 | 0.002 |
| 6 | Chlorosulfonic acid | 5.6 | |
|   | Common fuller's earth | 11.2 | Less than 0.00001 |
| 7 | Chlorosulfonic acid | 2.8 | |
|   | Super Filtrol | 11.2 | Less than 0.0000 |
| 8 | Aluminum chloride | 11.2 | |
|   | Super Filtrol | 11.2 | 0.000 |

[1] Percent $CH_2$ represents the empirical formula given for the carbonaceous or organic matter found in crude sulphur; the ratio of hydrogen to carbon was established by combustion analyses made on many representative samples of crude sulphur.

From the foregoing table it will be observed that the chlorosulphonic acid treatment in accordance with the present invention produces a refined sulphur of very much greater purity than is obtainable by the other processes. It will be observed further that both the quantity of acid and the quantity of absorbent used in the present process are remarkably less than used in the other processes. It may be ascertained from a study of the table, in particular tests Nos. 2, 6 and 7, that the sulphur trioxide content is not the controlling factor in accomplishing the purification, for in test No. 2 the available amount is 11.2 pounds and in tests Nos. 6 and 7 it is only 4.6 pounds, per long ton of sulphur treated.

Since standard methods of determining the carbonaceous content of sulphur were found to be inadequate in analyzing the refined sulphur products, a technique was developed based upon a very sensitive color comparison. In this new method a sample of sulphur is heated to the boiling point in a suitable closed vessel and held at that temperature for a period of five minutes, during which period the carbonaceous matter quantitatively reacts with the sulphur to produce a colored compound which after several hundred analyses has been determined invariably to possess the formula of approximately $C_4S_4$. The color of this carbon-sulphur complex is black and is so extremely finely divided and evenly distributed throughout the sulphur that, even in minute traces, it imparts a distinct discoloration to the sulphur, depending upon the quantity present.

In continuing the preparation of the samples to be tested after the five minute period has elapsed, the sulphur in the vessel is permitted to cool and is ground and screened to separate a fraction of between 30 and 50 mesh screen. Color determination applied to these samples indicates differences in composition as small as 0.00001 percent $CH_2$.

In the following table the purity of the refined sulphur produced by the present invention is compared with the present commercially available refined brimstone produced by the conventional distillation process. Two different samples of the refined brimstone are compared with a sample produced in accordance with the present invention using extremely small quantities of chlorosulphonic acid and fuller's earth.

Table II

| The sample tested | Percent $CH^2$ | Percent ash | Percent acidity (as $H_2SO_4$) |
|---|---|---|---|
| Commercial refined brimstone | .00009 | .004 | .002 |
| Do | .00005 | .002 | .002 |
| Chlorosulfonic acid treated crude sulphur (2.8 lbs. $HClSO_3$, 11.2 lbs. fuller's earth per ton) | Less than .00001 | Less than .001 | Less than .001 |

These comparisons show very clearly the superiority of the present purification method.

Since a substantial proportion of refined sulphur is consumed in treatments involving burning of the sulphur, the burning quality of the refined sulphur produced by the present invention is compared below with the various prior art refined sulphurs. The burning qualities of the sulphurs, refined by the processes defined in Tables I and II, are compared in the following table.

Table III

| Sulphur product | Percent free burning |
|---|---|
| Crude sulphur | 80.0 |
| after $AlCl_3$ treatment | 99.0 |
| after activated carbon treatment | 87.1 |
| after activated fuller's earth treatment | 90.4 |
| after sulphuric acid treatment | 96.2 |
| after zeolite treatment | 98.0 |
| after chlorosulfonic acid treatment | 99.9+ |
| Commercial refined brimstone | 99.8 |
| Do | 99.6 |

From the foregoing table it will be observed that the crude sulphur purified in accordance with the present process has a free burning percentage of more than 99.9 percent and is superior to any of the prior products in this respect. Practically considered the small difference in percentage represents a great difference to commercial operators using refined sulphur.

In the tests recorded in the foregoing table, the free burning percentage was determined by melting 20 grams of the refined sulphur in a tared high form crucible and igniting the contents by means of a heated wire. As the burning progresses small portions of sulphur are continually added at a rate which maintains a constant level in the crucible, such additions being continued until a total weight of approximately 100 grams has been added. The sulphur is permitted to burn without the application of external heat until the flame goes out of its own accord. Thereupon the crucible is dried, and the weight of the residue calculated.

The process of the present invention possesses many advantages over the prior art processes and may be summarized as follows. The present process produces refined sulphurs having a higher purity than any products heretofore produced by the processes of the prior art. The present processes are applicable to the treatment of all crudes regardless of the nature of the organic impurities contained therein. The equipment required to carry out the process is of relatively simple construction, and the operation of the process involves none of the problems of explosion, fire or corrosion, or collection of the product in powdered form. The cost of constructing and of operating a plant to carry out the instant process is substantially less than that required in the distillation process. For example, a plant adapted to produce 100 tons of refined sulphur per day using the instant process costs about one-half that of a retort chamber refinery having a capacity of only one-tenth or one-twentieth as large. Finally, the total cost of production using the instant process is only a fraction of that of the prior processes.

It should be understood that the present invention is not limited to the specific methods of contacting and other manipulative steps and proportions disclosed herein, for the invention extends to all variations which will occur to those skilled in the art upon consideration of the factors involved. The scope of the present invention is limited only by the claims appended hereto.

I claim:

1. The method of obtaining sulphur substantially free from impurities from impure sulphur containing less than about .05 percent organic impurities, which comprises intimately mixing a body of said impure sulphur at a temperature of from 250°–320° F. with chlorosulphonic acid and with a filter aid, and separating the filter aid and the resulting reacted impurities from the sulphur.

2. The method of removing the impurities from sulphur containing less than about .05 percent organic impurities which comprises intimately mixing a body of said sulphur in molten condition with chlorosulphonic acid whereby the impurities react with the acid, and separating the reaction products from the sulphur.

3. The method of purifying sulphur containing less than about .05 percent organic impurities which comprises melting the sulphur, introducing chlorosulphonic acid into a body of the melted sulphur, agitating the resulting mixture and separating the treated sulphur from the reaction products formed with the assistance of a filter aid.

4. The method of purifying sulphur containing less than about .05 percent of organic impurities which comprises melting the sulphur, agitating a body of the same with an addition of chlorosulphonic acid whereby the acid reacts with the organic impurities, introducing into the mass a finely divided absorbent material and separating the treated sulphur from the absorbent material and impurities held therein.

5. The method of refining sulphur containing less than about .05 percent organic impurities comprising agitating a body of impure molten sulphur in admixture with chlorosulphonic acid and fuller's earth, and after the acid has reacted with the organic impurities present, separating the sulphur from the earth and reacted impurities.

6. The method of refining sulphur containing less than about .05 percent organic impurities comprising intimately mixing a body of the sulphur in molten condition with chlorosulphonic acid to form readily removable derivatives of organic impurities therein and separating from the body of sulphur the reacted impurities and other impurities with the aid of an addition of an acid-leached earth absorbent.

7. The method of producing highly refined sulphur from off-color sulphur containing less than about .05 percent organic impurities which comprises intimately contacting a body of said off-color sulphur in a non-viscous molten condition with chlorosulphonic acid and a finely divided absorbent material, and separating the treated sulphur from the absorbent and impurities held therein.

ROBERT C. HILLS.

CERTIFICATE OF CORRECTION.

Patent No. 2,353,959. July 18, 1944.

ROBERT C. HILLS.

It is hereby certified that error appears in the printed specification of the above numbered patent requiring correction as follows: Page 2, second column, Table 1, last column thereof, opposite Test No. 7, for "less than 0.0000" read --less than 0.00001--; and opposite Test No. 8, for --0.000" read --0.0002--; and that the said Letters Patent should be read with this correction therein that the same may conform to the record of the case in the Patent Office.

Signed and sealed this 29th day of August, A. D. 1944.

Leslie Frazer (Seal) Acting Commissioner of Patents.